United States Patent [19]

Batzill et al.

[11] Patent Number: 4,988,420

[45] Date of Patent: Jan. 29, 1991

[54] ELECTROPHORECTICALLY OVERCAOTABLE COATINGS APPLIED BY ELECTROCOATING

[75] Inventors: Wolfgang Batzill; Ulrich Heilmann; Hans J. Streitberger, all of Münster; Harald Guder, Wuppertal; Fritz Beck, Duisburg, all of Fed. Rep. of Germany

[73] Assignee: BASF Lacke & Farben Aktiengesellschaft, Münster, Fed. Rep. of Germany

[21] Appl. No.: 407,875

[22] Filed: Sep. 15, 1989

Related U.S. Application Data

[62] Division of Ser. No. 72,269, filed as PCT EP86/00585 on Oct. 13, 1986, published as WO87/02717 on May 7, 1987, Pat. No. 4,882,090.

[30] Foreign Application Priority Data

Oct. 31, 1985 [DE] Fed. Rep. of Germany ....... 3538792

[51] Int. Cl.$^5$ .................... B05D 7/14; C25D 13/06
[52] U.S. Cl. ................ 204/181.1; 204/181.7; 252/511; 523/468; 524/495; 524/496; 106/472
[58] Field of Search .................. 204/181.1, 181.7; 106/472; 524/901, 495; 523/416, 468

[56] References Cited

U.S. PATENT DOCUMENTS

| 4,208,262 | 6/1980 | Kubo | 204/181.1 |
| 4,375,498 | 3/1983 | Le Minez | 204/181.1 |
| 4,456,507 | 6/1984 | Kivel | 204/181.1 |
| 4,575,523 | 3/1986 | Anderson | 204/181.7 |
| 4,755,418 | 6/1988 | DebRoy | 204/181.1 |

Primary Examiner—John F. Niebling
Assistant Examiner—David G. Ryser
Attorney, Agent, or Firm—Kenyon & Kenyon

[57] ABSTRACT

The invention relates to a cathodically depositable aqueous electropaints which contain cationic amine-modified epoxy resins and are pigmented, with electro-conductive carbon black and which, on deposition and crosslinking, provide electrophoroetically overcoatable coatings and contain as electroconductive carbon black a carbon black having an iodine absorption of 870–930 mg/g, a specific surface area (BET/N$_2$) of 850–1,000 m$^2$/g, a pore volume (DBP) of 330–390 ml/100 g and an average particle size of 25–35 nm in an amount of 1.5 to 5.1% by weight—based on total solids.

2 Claims, No Drawings

ELECTROPHORECTICALLY OVERCAOTABLE COATINGS APPLIED BY ELECTROCOATING

This application is a division of application Ser. No. 072,269, filed as PCT EP86/00585 on Oct. 13, 1986, published as WO87/02717 on May 7, 1987, now U.S. Pat. No. 4,882,090.

The present invention relates to cathodically depositable aqueous electropaints which contain cationic amine-modified epoxy resins and are pigmented with electroconductive carbon black and which, after deposition and crosslinking, provide electrophoretically overcoatable coatings.

Cathodic electrocoating is a very frequently employed coating method, whereby water-dilutable synthetic resins with cathodic groups are applied to electroconductive bodies.

Cationic amine-modified epoxy resins are particularly highly suitable for use as binders for aqueous cathodically depositable electropaints.

In standard electrocoating, the coating deposited is electrically insulating and no longer electrophoretically overcoatable.

To make it possible to use the technically very advantageous cathodic electrocoating process not just for base coating but for the production of multibuild coats as well, it has been tried to obtain electrophoretically overcoatable electropaint coats by depositing aqueous electropaints pigmented with conductive carbon blacks (GB 2,129,807).

In said GB 2,129,807, 8-50% by weight of finely divided carbon—for example graphite or carbon black having an oil absorption of 45-115 ml/100 g and a particle diameter of 15-85 μm—are added to a cathodically depositable aqueous electropaint containing a cationic synthetic resin as binder.

However, the use of carbon black in electropaints leads to flaws in the surfaces of the deposited coats (roughness, pores, holes . . . ), which reduce the protection against corrosion and adversely affect the appearance and the physico-chemical properties of the electrophoretically applied second coat.

The surface flaws caused by the admixture of carbon black pigments decrease in intensity and frequency with decreasing carbon black concentration.

A further very important point to be observed in the industrial application of carbon black pigmented electropaints is the reliability with which the carbon black pigment can be applied. Application reliability can be said to be high when electrophoretically overcoatable coatings having a tolerable degree of surface flaws are obtained even in the event of major fluctuations in the concentration of carbon black.

The invention has for its object to provide, for use in cathodically depositable aqueous electropaints which contain cationic amine-modified epoxy resins and are pigmented with electroconductive carbon black and which, after deposition and crosslinking, provide electrophoretically overcoatable coatings, carbon black pigments which not only can be employed in a very low concentration but also guarantee a high degree of application reliability.

This object is achieved according to the invention by employing as the electroconductive carbon black a carbon black which has an iodine absorption of 870-930 mg/g, a specific surface area (BET/$N_2$) of 850-1,000 $m^2$/g, a pore volume (DBP) of 330-390 ml/100 g and an average particle size of 25-35 nm in an amount of 1.5-5.1% by weight—based on total solids.

The invention also relates to a process for preparing a multibuild coating by applying to an electroconductive substrate by electrophoresis a cathodically depositable aqueous electropaint which contains a cationic amine-modified epoxy resin and is pigmented with electroconductive carbon black, crosslinking, and overcoating, again by electrophoresis, wherein the electropaint used for preparing the basecoat contains as electroconductive carbon black a carbon black in an amount of 1.5-5.1% by weight, based on total solids—which has the following analytical data:

|  |  | ASTM test method used |
|---|---|---|
| Iodine absorption | 870-930 mg/g | D 1510-79 |
| Specific surface area (BET/$N_2$) | 850-1000 $m^2$/g | D 3027-78 |
| Pore volume (DBP) | 330-390 ml/100 g | D 2414-79 |
| Average particle size | 25-35 nm |  |

The process is carried out as follows:

The electroconductive substrate to be coated is dipped into the aqueous electrocoating bath and, after applying an electrical voltage between an anode and the substrate connected as cathode, is coated.

On conclusion of deposition the substrate is removed from the bath, and the applied coat is rinsed off and baked in a known manner. This is followed, under the same conditions, by a further electrophoretic coating step and aftertreatment.

Virtually any electroconductive substrates can be coated by the process according to the invention. Customarily they are metal substrates, for example iron, steel, copper, zinc, brass, tin, nickel, chromium or aluminum, which can be phosphatized, chromatized or otherwise pretreated.

The carbon blacks used according to the invention are distinguished by an iodine absorption of 870-930 mg/g, a specific surface area (BET/$N_2$) of 850-1,000 $m^2$/g, a pore volume (DBP) of 330-390 ml/100 g and an average particle size of 25-35 nm.

A carbon black found to be particularly suitable has an iodine absorption of 900 mg/g, a specific surface area (BET/$N_2$) of 950 $m^2$/g, a pore volume (DBP) of 360 ml/100 g and an average particle size of 30 nm.

A carbon black of this type is marketed by Akzo Chemie under the trademark KETJENBLACK EC. In the brochure issued with this product it is pointed out that KETJENBLACK EC is usable for increasing the conductivity of polymer mixtures such as plastics and rubber mixtures and that to obtain a certain conductivity the amount of KETJENBLACK EC which is required is only a third or a quarter of that which would be required in the case of other electroconductive carbon blacks.

However, the brochure provides no indication whatsoever that KETJENBLACK EC is usable in aqueous electropaints, and it is surprising that this carbon black can be used in a very low concentration in cathodically depositable aqueous electropaints which contain cationic amine-modified epoxy resins and are pigmented with electroconductive carbon black and which, after deposition and crosslinking, are to provide electrophoretically overcoatable coats and at the same time guarantees a high degree of application reliability.

The electropaints according to the invention provide coatings which are electrophoretically overcoatable not only by the anodic but also by the cathodic electrocoating process.

If the electropaints pigmented according to the invention are used for the overcoats, it is also possible to build coatings which consist of more than two layers.

Electropaints which contain less than 1.5% by weight—based on total solids—of the carbon blacks according to the invention provide coatings which can no longer be electrophoretically overcoated with a continuous second coat.

If the carbon black concentration is above 5.1% by weight, the coatings obtained have no longer tolerable surface flaws (warts).

The cationic amine-modified epoxy resins used as binders are reaction products formed from (A) polyepoxides (B) primary and/or secondary amines or salts thereof and/or salts of tertiary amines and optionally (C) polyfunctional alcohols, polycarboxylic acids, polyamines or polysulfides.

Water-dispersible products are obtained after neutralization with an acid.

Suitable for use as component A is any compound which contains two or more epoxy groups in the molecule. Preference is given to those compounds which contain two epoxy groups in the molecule and have a relatively low molecular weight of at most 750, preferably 400–500.

Particularly preferred epoxy compounds are polyglycidyl ethers of polyphenols prepared from polyphenols and epihalohydrins. Suitable polyphenols are for example very particularly preferably bisphenol A and bisphenol F and particularly preferably 1,1-bis-(4-hydroxyphenyl)-n-heptane.

Also suitable are 4,4'-dihydroxybenzophenone, bis-(4-hydroxyphenyl)-1,1-ethane, bis-(4-hydroxyphenyl)-1,1-isobutane, bis-(4-hydroxy-tertiary-butylphenyl)-2,2-propane, bis-(2-hydroxynaphthyl)methane, 1,5-dihydroxynaphthalene and phenolic novolak resins.

Preferred epoxy compounds also include polyglycidyl ethers of polyhydric alcohols, for example ethylene glycol, diethylene glycol, triethylene glycol, 1,2-propylene glycol, 1,4-propylene glycol, 1,5-pentanediol, 1,2,6-hexanetriol, glycerol and bis-(4-hydroxycyclohexyl)-2,2-propane.

It is also possible to use polyglycidyl esters of polycarboxylic acids, for example oxalic acid, succinic acid, glutaric acid, terephthalic acid, 2,6-naphthalenedicarboxylic acid, dimerized linolenic acid. Typical examples are glycidyl adipate and glycidyl phthalate.

It is also possible to use hydantoin epoxides, epoxidized polybutadiene and polyepoxy compounds which are obtained by epoxidizing an olefinically unsaturated alicyclic compound.

Suitable for use as component B are primary and/or secondary amines and salts thereof and/or salts of tertiary amines, the secondary amines being particularly preferred components B.

Preferably the amine should be a water-soluble compound. Examples of such amines are mono- and dialkylamines, such as methylamine, ethylamine, propylamine, butylamine, dimethylamine, diethylamine, dipropylamine, methylbutylamine and the like. Likewise suitable are alkanolamines such as, for example, methylethanolamine, diethanolamine and the like. It is further possible to use dialkylaminoalkylamines such as, for example, dimethylaminoethylamine, diethylaminopropylamine, dimethylaminopropylamine and the like. In most cases use is made of relatively low molecular weight amines, but it is also possible to use relatively high molecular weight monoamines.

Polyamines having primary and secondary amino groups can be reacted with the epoxy groups in the form of their ketimines. The ketimines are prepared from the polyamines in a known manner.

The amines can also contain other groups, but these groups should not interfere with the reaction of the amine with the epoxy group, nor cause the reaction mixture to gel.

The charges required for water-dilutability and electrical deposition can be produced by protonation with water-soluble acids (for example boric acid, formic acid, lactic acid, propionic acid, butyric acid, hydrochloric acid, phosphoric acid, sulfuric acid, carbonic acid, preferably acetic acid) or, alternatively, by reacting the oxirane groups with salts of an amine.

The amine salt used can be the salt of a tertiary amine.

The amine part of the amine/acid salt is an amine which can be unsubstituted or substituted, as in the case of hydroxylamine, provided these substituents do not interfere with the reaction of the amine/acid salt with the polyepoxide or cause the reaction mixture to gel. Preferred amines are tertiary amines, such as dimethylethanolamine, triethylamine, trimethylamine, triisopropylamine and the like. Examples of other suitable amines are given in U.S. Pat. No. 3,839,252 in column 5, line 3 to column 7, line 42.

Suitable for use as component C are polyfunctional alcohols, polycarboxylic acids, polyamines or polysulfides or mixtures of compounds of these classes of substances.

Suitable polyols include diols, triols and higher polymeric polyols, such as polyester polyols, polyether polyols.

Polyalkylene ether polyols suitable for use as component C conform to the general formula:

in which R is hydrogen or a lower alkyl radical, with or without various substituents, n is 2 to 6 and m is 3 to 50 or even higher. Examples are poly(oxytetramethylene) glycols and poly(oxyethylene) glycols.

The preferred polyalkylene ether polyols are poly(oxytetramethylene) glycols having a molecular weight within the range from 350 to 1,000.

Polyester polyols can likewise be used as polymeric polyol component. The polyester polyols can be prepared by polyesterification of organic polycarbonate acids or anhydrides thereof with organic polyols which contain primary hydroxyl groups. Customarily the polycarboxylic acids and the polyols are aliphatic or aromatic dicarboxylic acids and diols.

The diols used for preparing the polyesters include alkylene glycols such as ethylene glycol, butylene glycol, neopentylglycol and other glycols such as cyclohexanedimethanol.

The acid component of polyester consists primarily of low molecular weight carboxylic acids or anhydrides thereof with 2 to 18 carbon atoms in the molecule. Suitable acids are for example phthalic acid, isophthalic acid, terephthalic acid, tetrahydrophthalic acid, hexahydrophthalic acid, adipic acid, azelaic acid, sebacic acid, maleic acid and glutaric acid. In place of these acids it is also possible to use their anhydrides, provided they exist.

It is also possible to use as component (C) polyester polyols which are derived from lactones. These products are obtained by reacting an ε-caprolactone with a polyol. Products of this type are described in U.S. Pat. No. 3,169,945.

The polylactone polyols which are obtained by this reaction are distinguished by the presence of a terminal hydroxyl group and by recurring polyester portions which are derived from the lactone. These recurring molecule fragments can conform to the formula

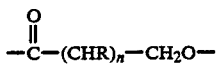

in which n is at least 4, preferably 4 to 6, and the substituent is hydrogen, an alkyl radical, a cycloalkyl radical or an alkoxy radical.

Component C can also be an aliphatic and/or alicyclic polyfunctional alcohol or carboxylic acid having a molecular weight below 350. Advantageously these alcohols and carboxylic acids have a branched aliphatic chain, in particular a chain with at least one neo structure.

Suitable compounds conform to the following general formula:

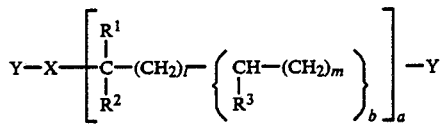

where
Y=OH, COOH,
X=(CH$_2$)$_n$

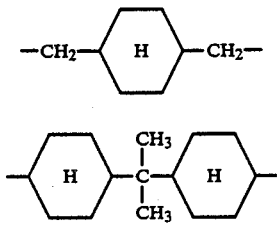

R$^1$, R$^2$, R$^3$=H, alkyl radical having 1 to 5 carbon atoms,
a=0;1,
b=0;1,
l=0–10,
m,n=1–10.

Specific examples are: diols, such as ethylene glycol, diglycol, dipropylene glycol, dibutylene glycol, triglycol, 1,2-propanediol, 1,3-propanediol, 2,2-dimethyl-1,3-propanediol, 2,2-diethyl-1,3-propanediol, 2-methyl-2-ethyl-1,3-propanediol, 2-methyl-2-propyl-1,3-propanediol, 2-ethyl-2-butyl-1,3-propanediol, 1,2-butanediol, 1,4-butanediol, 2,3-butanediol, 2-ethyl-1,4-butanediol, 2,2-diethyl-1,3-butanediol, butene-2-diol-1,4, 1,2-pentanediol, 1,5-pentanediol, 3-methyl-1,5-pentanediol, 1,6-hexanediol, 2,5-hexanediol, 2-ethyl-1,3-hexanediol, 2,5-dimethyl-2,5-hexanediol, 1,3-octanediol, 4,5-nonanediol, 2,10-decanediol, 2-hydroxyethyl hydroxyacetate, 2,2-dimethyl-3-hydroxypropyl 2,2-dimethylhydroxypropionate, 2-methyl-2-propyl-3-hydroxypropyl 2-methyl-2-propylhydroxypropionate, 4,4'-methylenebiscyclohexanol and 4,4'-isopropylidenebiscyclohexanol. Some preferred diols are 2,2-dimethyl-1,3-propanediol, 3-methyl-1,5-pentanediol, 2,2-dimethyl-3-hydroxypropyl 2,2-dimethylhydroxypropionate and 4,4'-isopropylidenebiscyclohexanol.

The carboxylic acid used can be any one of a large number of dicarboxylic acids, such as oxalic acid, malonic acid, 2,2-dimethylmalonic acid, succinic acid, glutaric acid, adipic acid, hexahydrophthalic acid, maleic acid, fumaric acid, pimelic acid, suberic acid, azelaic acid, sebacic acid, itaconic acid, citraconic acid, mesaconic acid and glutaconic acid.

Dicarboxylic acids which are preferably used are for example 2,2-dimethylmalonic acid and hexahydrophthalic acid.

It is also possible to use long-chain dicarboxylic acids as component C. Examples thereof are dimeric fatty acids, such as, for example, dimeric linoleic acid.

Suitable polyamines for elastification can be prepared for example by reacting primary diamines and monoepoxides. The secondary, substituted diamines formed modify the epoxy resins in a suitable manner.

Component C can also be a primary-tertiary diamine or an alkanolamine such as aminoethanol or aminopropanol.

Suitable polyfunctional SH compounds are reaction products of organic dihalides with sodium polysulfide. Further SH compounds are for example reaction products of hydroxyl-containing linear polyesters, polyethers or polyurethanes with mercaptocarboxylic acids such as mercaptoacetic acid, 2-mercaptopropionic acid, 3-mercaptopropionic acid, mercaptobutyric acid and the like.

Polyphenols suitable for use as component C conform to the general formula (I)

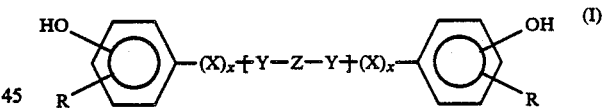

in which X=alkylene, arylene, alkarylene, O,O-alkylene, O-arylene, O-alkarylene, S, S-alkylene, S-arylene, S-alkarylene, CO, CO-alkylene, CO-arylene, CO-alkarylene, NH, NH-alkylene, NH-arylene or NH-alkarylene, x=0 or 1,

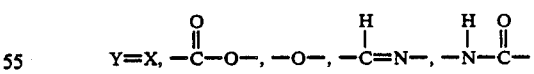

Z=alkylene, alkylene radical based on polyesters, polyethers, polyamides, polycarbonates or polyurethanes and R=H, CH$_3$, alkyl-, —O—CH$_3$, —O-alkyl, —NO$_2$, NR'$_2$', —NR'R''', —NHCOR'''.

Finally, component (C) can also comprise polyurethanes prepared by generally known methods.

The binders used according to the invention can be conventionally crosslinked by addition of crosslinking agents or converted into self-crosslinking systems by chemical modification. A self-crosslinking system can be obtained for example by reacting the binder with a partially blocked polyisocyanate which has on average one free isocyanate group per molecule and whose blocked isocyanate groups only become unblocked at elevated temperatures. Suitable crosslinking agents are virtually all at least bifunctional compounds which react with oxirane groups, for example polyalcohols, polyphenols, polycarboxylic acids, polycarboxylic anhydrides, polycarboxamides, polyamines, polyisocyanates, phenolic resins.

The crosslinking agents are generally used in an amount of 5 to 60, preferably 20 to 40, % by weight, based on the binder.

Frequently employed methods for crosslinking binders are described for example in the following patent documents: GB No. 1,303,480, European Patent Application No. 12,463, U.S. Pat. No. 4,252,703 and GB No. 1,557,516.

Examples of suitable amino resin crosslinking agents are the hexamethyl ether of hexamethylolmelamine, the triethyltrimethyl ether of hexamethylolmelamine, the hexabutyl ether of hexamethylolmelamine and the hexamethyl ether of hexamethylolmelamine and polymeric butylated melamine-formaldehyde resins. Alkylated ureaformaldehyde resins are also usable. Preferred cross-linking agents are blocked polyisocyanates. With the binders used according to the invention it is possible to use any desired polyisocyanates where the isocyanate groups have been reacted with a compound, so that the blocked polyisocyanate formed is resistant to hydroxyl groups at room temperature but reacts at elevated temperatures, in general within the range from about 90° to about 300° C. In the preparation of blocked polyisocyanates, it is possible to use any desired organic polyisocyanate suitable for the crosslinking. Preference is given to isocyanates which contain about 3 to 36, in particular about 8 to about 15 carbon atoms. Examples of suitable diisocyanates are trimethylene diisocyanate, tetramethylene diisocyanate, pentamethylene diisocyanate, hexamethylene diisocyanate, propylene diisocyanate, ethylethylene diisocyanate, 2,3-dimethylethylene diisocyanate, 1-methyltrimethylene diisocyanate, 1,3-cyclopentylene diisocyanate, 1,4-cyclohexylene diisocyanate, 1,2-cyclohexylene diisocyanate, 1,3-phenylene diisocyanate, 1,4-phenylene diisocyanate, 2,4-toluylene diisocyanate, 2,6-toluylene diisocyanate, 4,4-diphenylene diisocyanate, 1,5-naphthylene diisocyanate, 1,4-naphthylene diisocyanate, 1-isocyanatomethyl-5-isocyanato-1,3,3-trimethylcyclohexane, bis(4-isocyanatocyclohexyl)methane, bis(4-isocyanatophenyl)methane, 4,4'-diisocyanatodiphenyl ether and 2,3-bis(8-isocyanatooctyl)-4-octyl-5-hexylcyclohexane. It is also possible to use polyisocyanates of higher isocyanate functionality. Examples thereof are tris(4-isocyanatophenyl)methane, 1,3,5-triisocyanatobenzene, 2,4,6-triisocyanatotoluene, 1,3,5-tris(6-isocyanatohexylbiuret), bis(2,5-diisocyanato-4-methylphenyl)methane and polymeric polyisocyanates, such as dimers and trimers of diisocyanatotoluene. It is further also possible to use mixtures of polyisocyanates. The organic polyisocyanates which come into consideration for use as crosslinking agents in the invention can also be prepolymers which are derived for example from a polyol, including a polyether polyol or a polyester polyol.

To block the polyisocyanates it is possible to use any desired suitable aliphatic, cycloaliphatic or aromatic alkyl monoalcohols. Examples thereof are aliphatic alcohols, such as methyl, ethyl, chloroethyl, propyl, butyl, amyl, hexyl, heptyl, octyl, nonyl, 3,3,5-trimethylhexyl, decyl or lauryl alcohol, cycloaliphatic alcohols such as cyclopentanol and cyclohexanol, aromatic alkyl alcohols, such as phenylcarbinol and methylphenylcarbinol.

Other suitable blocking agents are hydroxylamines such as ethanolamine, oximes such as methyl ethyl ketone oxime, acetone oxime and cyclohexanone oxime or amines such as dibutylamine and diisopropylamine. The polyisocyanates and blocking agents mentioned, provided they are mixed in suitable ratios, can also be used for preparing the partially blocked polyisocyanates described above.

Binders which are preferably usable for the present invention are disclosed in DEP 2,701,002, the contents of which are incorporated herein by reference.

The aqueous coating composition according to the invention can in general contain customary additives such as, for example, coalescent solvents, pigments, surface-active agents, crosslinking catalysts, antioxidants, fillers and antifoams.

The invention is illustrated in more detail in the following examples. Parts and percentages are by weight, unless otherwise stated.

Preparation of a polyurethane crosslinking agent for binder C (in accordance with Example 1 of DEP No. 2,701,002)

A polyurethane crosslinking agent was prepared in a reactor by slowly adding 218 parts by weight of 2-ethylhexanol to 291 parts by weight of an 80/20 isomer mixture of 2,4-/2,6-toluene diisocyanate with stirring in a nitrogen atmosphere, the reaction temperature being maintained below 38° C. by external cooling. The batch was then maintained at 38° C. for a further half hour and thereafter heated to 60° C., whereafter 75 parts by weight of trimethylolpropane and then 0.08 part of dibutyltin dilaurate were added as catalyst. After an exothermic reaction at the start, the batch was maintained at 121° C. for 1.5 hours, until substantially all the isocyanate groups had been consumed, which could be seen on an infrared spectrum. The batch was then diluted with 249 parts of ethylene glycol monoethyl ether.

Preparation of a binder concentrate of binder C (in accordance with Example 6 of DEP No. 2,701,002)

A suitable reactor was charged with 882.9 parts of a commercially available polyglycidyl ether of a polyphenol having an epoxy equivalent of 465, 251.8 parts of poly(neopentylglycol adipate) having a molecular weight of 530 and 69.9 parts of xylene. The batch was heated under reflux to the boil under a nitrogen atmosphere for about 20 minutes, during which the water was removed from the azeotropic mixture. After cooling to 130° C., 3.2 parts of benzyldimethylamine were added, and the batch was maintained at 130° C. for 2 hours and 20 minutes. 862 parts of the polyurethane crosslinking agent were then added. The reaction temperature was reduced to 0° C., and 73.8 parts of a solution containing 73% of non-volatile portions of the methyl isobutyl diketimine of diethylenetriamine in methyl isobutyl ketone were added. 56.1 parts of N-methylethanolamine were then added, and the batch was heated to 110° C. After that temperature had been maintained for about 1 hour, 90.4 parts of ethylene glycol monohexyl ether were added. Methyl isobutyl ketone and ethylglycol were then added to dilute to a solids content of 65%.

Catalyst paste for binder C (in accordance with Example 6 of DEP 2,701,002)

The catalyst paste used was prepared from the following starting materials:

| Constituents | Parts by weight |
| --- | --- |
| binder concentrate | 201.5 |
| deionized water | 460.3 |
| dibutyltin oxide | 283.7 |

These constituents were mixed and comminuted in a suitable mill to Hegman fineness No. 7.

Carbon blacks used 5 different carbon blacks were used as pigments. Their most important properties are given in the following table:

$R_1$ is a coloring black; the other 4 kinds of carbon black are pronounced conducting blacks.

| Carbon black | Manufacturer | Particle diameter nm | BET surface $m^2g^{-1}$ area | DBP absorption ml 100 g |
| --- | --- | --- | --- | --- |
| $R_1$ (Raven 410) | Columbian | 70 | 28 | 70 |
| $R_2$ (Corax L) | Degussa | 23 | 150 | 123 |
| $R_3$ (Corax L6) | Degussa | 18 | 265 | 136 |
| $R_4$ (Conductex 40-220) | Columbian | 16 | 1075 | 228 |
| $R_5$ (Ketjen Black EC) | AKZO | 30 | 950 | 360 |

Preparation of concentrates pigmented with carbon black

The carbon blacks were incorporated into the binder by means of a dissolver.

To this end, binder concentrate, carbon black and neutralizing agent were weighed out into a three liter metal can. By adding additional, concentrate-specific organic solvents the viscosity of the mixture was adjusted in such a way that the dissolver was able to agitate the mixture.

Milling then takes place at 3,500 r.p.m. until no particles greater than 5 μm were present any longer (Hegman Grindometer). The carbon black pigmented and partially neutralized concentrates thus obtained are storable for some months and are then easily dilutable to electrocoating baths.

Formulation of electrocoating baths

The electrocoating baths were prepared by stirring together carbon black pigmented concentrate, additional binder, neutralizing agent and organic solvents using a V2A stainless steel blade stirrer and thereafter diluting the mixture with distilled water.

The respective amounts were calculated in such a way that the coating baths within a carbon black concentration series always contained the same amounts of binder, solvent, neutralizing agent and water. They only differed in the carbon black they contained and hence also in the solids content.

The composition of the baths is given in the table below for the customary 3 l batch. The table also provides information about the degrees of neutralization $\alpha$ of the formulations. The solvent quantities relate to the original weight. The respective carbon black contents of the baths were obtained either by preparing a fresh mixture from the start or by weighing together appropriate amounts of high- and low-pigmented baths.

The baths contain still larger amounts of organic solvent which were necessary for incorporating and wetting the carbon black but which interfere with the deposition.

For that reason the baths were stirred for some time at elevated temperature before use. This stirring was accompanied by loss of solvents which is replaced by distilled water, and an aging of the bath.

| Binder | Types of carbon black | $m_{BM}/g$ | $m_{H_2O}/g$ | $m_{Lsgm}/g$ | $m_R/g$ | FK/% | Carbon/% black in FK | $\alpha$/% |
| --- | --- | --- | --- | --- | --- | --- | --- | --- |
| A | $R_1$ | 213.3 | 2285.1 | 415.0 | 0–68.8 | 7.9–10.0 | 0–22.9 | 143 |
| A | $R_2$ | 213.3 | 2285.1 | 415.0 | 0–68.8 | 7.9–10.0 | 0–22.9 | 143 |
| A | $R_3$ | 213.3 | 2285.1 | 415.0 | 0–68.8 | 7.9–10.0 | 0–22.9 | 143 |
| A | $R_4$ | 213.3 | 2285.1 | 415.0 | 0–31.3 | 7.9–8.9 | 0–11.9 | 143 |
| A | $R_5$ | 213.3 | 2285.1 | 415.0 | 0–31.3 | 7.9–8.9 | 0–11.9 | 143 |
| C | $R_1$ | 435.4 | 2075.1 | 297.2 | 0–104.7 | 15.0–18.0 | 0–19.4 | 50 |
| C | $R_2$ | 435.4 | 2075.1 | 297.2 | 0–104.7 | 15.0–18.0 | 0–19.4 | 50 |
| C | $R_3$ | 435.4 | 2075.1 | 297.2 | 0–104.7 | 15.0–18.0 | 0–19.4 | 50 |
| C | $R_4$ | 435.4 | 2055.0 | 363.4 | 0–58.6 | 15.0–16.5 | 0–11.9 | 50 |
| C | $R_5$ | 435.4 | 2055.0 | 363.4 | 0–58.6 | 15.0–16.5 | 0–11.9 | 50 |

Composition of the baths

BM = binder
R = carbon black
FK = solids content
m = mass
g = gram
Lsgm = solvent Depositions The depositions were customarily carried out on ST 1203 steel sheets measuring 130×45×1 mm.
The steel sheets were pretreated as follows:
(a) degreasing in 40°–60° C. petroleum ether
(b) derusting with a steel brush
(c) cleaning with an abrasive powder
(d) rinsing off with distilled water
(e) rinsing off with acetone
(f) drying at 60° C.

Some coatings were carried out on phosphatized steel sheet (Bonder 120, Metallgesellschaft) of the same dimensions.

The coating of the steel sheets was carried out at constant voltage; the entire voltage was applied across the system immediately on switching on. The deposition voltage was 300 V in the case of binder C and 150 V in the case of binder A.

After the current was switched off, the coated samples were removed from the bath as quickly as possible and freed from adhering bath liquor by means of a concentrated jet of water. This is followed by rinsing with distilled water and blowing dry with air.

The baking time was 20 minutes. The baking temperatures were 170°–180° C.

Binder A

Binder A was the Luhydran E33 resin obtained from BASF AG, which is an anodically depositable polyacrylate resin which crosslinks via methylol ether groups (supply form: 70% strength in Isanol, acid number 37, neutralizing agent: dimethylethanolamine).

Evaluation of the experimental results

The following table shows for binder system C the minimum carbon black pigment concentration necessary for the deposition of a continuous second coat.

For comparison, corresponding measurements were carried out on binder system A.

| Binder | Pigment | $c_{GS}$/% by weight |
|---|---|---|
| C | $R_1$ | >19.4 |
| C | $R_2$ | 9.8 |
| C | $R_3$ | 7.5 |
| C | $R_4$ | 7.5 |
| C | $R_5$ | 1.5 |
| A | $R_1$ | 9.8 |
| A | $R_2$ | 4.4 |
| A | $R_3$ | 4.0 |
| A | $R_4$ | 4.0 |
| A | $R_5$ | 4.4 |

$c_{GS}$ = concentration limit for depositing a continuous second coat

The above table shows significant differences between the two binder systems C and A. Whereas system C, when filled with $R_5$, provides electrophoretically overcoatable coatings even at extremely low carbon black concentrations, in system A the $R_5$-filled samples are not special; here it is possible—irrespective of the carbon black used—to overcoat at above a carbon black concentration of 4.0% by weight.

On continuously increasing the carbon black concentration there comes a point where the surface flaws become intolerable. Wartlike structures appear. The formation of warts indicates that in these areas the wet film is already completely electroconductive.

The following table gives the carbon black pigment concentrations ($c_W$) from which on it was possible to identify warts in binder C.

| Binder | Pigmentation | $c_W$/% by weight |
|---|---|---|
| C | $R_1$ | 30.0 |
| C | $R_2$ | 17.8 |
| C | $R_3$ | 15.9 |
| C | $R_4$ | 11.9 |
| C | $R_5$ | 5.1 |

$c_W$ = concentration limit of wart formation

Since precise control of the carbon black pigment concentration in the electrocoating bath and in the deposited coat presents problems in industrial practice, the carbon black pigment used should offer a high degree of application reliability.

If the minimum carbon black concentration $c_{GS}$ necessary for depositing a continuous second coat is divided by the carbon black pigment concentration from which on formation of warts is observable ($c_W$), this produces a measure of application reliability:

| Binder | Pigmentation | $\dfrac{c_{GS}}{c_W}$ |
|---|---|---|
| C | $R_1$ | >0.647 |
| C | $R_2$ | 0.551 |
| C | $R_3$ | 0.472 |
| C | $R_4$ | 0.630 |
| C | $R_5$ | 0.294 |

The above table reveals that in the case of pigmentations with $R_5$ no more than 29.4% of the amount of carbon black at which wart formation is observed is needed to obtain an electrophoretically overcoatable coating. The wide range between the concentration limits $c_{GS}$ and $c_W$ thus offers a high degree of application reliability, which is nowhere near reached by the other conducting carbon blacks $R_2$, $R_3$ and $R_4$—which in addition need to be used in higher concentrations.

We claim:

1. A process for preparing a multibuild coating comprising:
    electrophoretically applying to an electrically conductive substrate a basecoat aqueous electropaint which contains a cationic amine-modified epoxy resin formed from (a) a polyepoxide, and (b) a primary or secondary amine or a salt thereof, or a tertiary amine salt, said basecoat being pigmented with an electroconductive carbon black in an amount ranging from 1.5 to 5.1% by weight based on the total solids and having an iodine absorption of 870–930 mg/g, a specific surface area (BET/$N_2$) of 850–1000 m$^2$/g, a pore volume (DEP) of 330–390 ml/1000 g and an average particle size of 25 to 35 nm;
    crosslinking the basecoat, and
    electrophoretically overcoating the crosslinked basecoat to form the multibuild coating.

2. A process as claimed in claim 3, wherein the electropaint used for preparing the base coat contains as electroconductive carbon black a carbon black having an iodine absorption of 900 mg/g, a specific surface area (BET/$N_2$) of 950 m$^2$/g, a pore volume (DBP) of 360 ml/100 g and an average particle size of 30 nm in an amount of 1.5 to 5.1% by weight—based on total solids.

* * * * *